(12) United States Patent
Tanibata (10) Patent No.: US 6,222,578 B1
(45) Date of Patent: Apr. 24, 2001

(54) IMAGE RECORDING APPARATUS FOR CORRECTING NONUNIFORMITIES IN THE EXPOSURE LIGHT AMOUNT

(75) Inventor: Toru Tanibata, Wakayama (JP)

(73) Assignee: Noritsu Koki Co., Ltd., Wakayama (JP)

( * ) Notice: Subject to any disclaimer, the term of this patent is extended or adjusted under 35 U.S.C. 154(b) by 0 days.

(21) Appl. No.: 09/280,816

(22) Filed: Mar. 30, 1999

(30) Foreign Application Priority Data

Apr. 1, 1998 (JP) .................................................. 10-088497

(51) Int. Cl.[7] .................................................. B41J 2/435
(52) U.S. Cl. .................................................. 347/236; 347/246
(58) Field of Search .................................................. 347/236, 237, 347/246; 355/41, 35, 68, 71, 27

(56) References Cited

U.S. PATENT DOCUMENTS

| | | | | |
|---|---|---|---|---|
| 5,661,544 | * | 8/1997 | Ishikawa et al. | 355/41 |
| 5,684,568 | * | 11/1997 | Ishikawa et al. | 355/68 |
| 5,790,240 | * | 8/1998 | Ishikawa et al. | 355/68 |
| 5,969,796 | * | 10/1999 | Mogi | 355/27 |

* cited by examiner

Primary Examiner—N. Le
Assistant Examiner—Hai C. Pham
(74) Attorney, Agent, or Firm—Smith Patent Office (57) ABSTRACT

In an image recording apparatus, exposure light amounts measured by a sensor immediately after a PLZT head performs an exposure with exposure light amounts corrected first by a controller using an original scanner or the like are stored in a memory as correction reference exposure light amounts. Thereafter, the controller performs an exposure correction such that the exposure light amounts measured by the sensor agree with the correction reference exposure light amounts. At this time, since the correction reference exposure light amounts are set according to the precision of the sensor, a shortage of the exposure light amount can be easily recognized by comparing both exposure light amounts even if the precision of the sensor is not high. As a result, the exposure correction can be reliably performed. Accordingly, the exposure light amounts can be accurately corrected even when using a sensor having a relatively large scanning displacement. As a result, the price of the image recording apparatus can be reduced.

9 Claims, 3 Drawing Sheets

FIG. 1

IMAGE RECORDING APPARATUS FOR CORRECTING NONUNIFORMITIES IN THE EXPOSURE LIGHT AMOUNT

BACKGROUND OF THE INVENTION

1. Field of the Invention

The present invention relates to an image recording apparatus provided with an exposing head that controls the exposure light to a photosensitive material in accordance with an image signal. In particular, the present invention relates to an image recording apparatus which can correct nonuniformities in exposure light amounts outputted from the exposing head. The present invention also relates to a method for recording images.

2. Discussion of the Related Art

Various image recording apparatuses, which are called digital line exposure devices, have been proposed. This type of image recording apparatus records images on paper by taking images on film or the like as image data, and exposes the paper to light in accordance with the image data obtained from the film.

Exposure control in an image recording apparatus is usually performed by an exposure unit. The exposure unit is comprised of, for example, an exposing head, a light source and an optical fiber bundle for introducing light from the light source to the exposing head. The exposing head is provided with shutter portions (light output portions) for individually controlling pixels (dots), which are linearly arranged in a direction (widthwise direction of the paper) normal to the transport direction of the paper, so as to block or unblock the transmission of the light.

When a drive voltage corresponding to the image data is applied to the shutter portion in a position corresponding to a desired pixel, the shutter portion is opened, and the light from the light source having been introduced to the shutter portion is emitted toward the printing paper, thereby exposing the paper. In this way, a desired pixel image can be recorded.

In the above described image recording apparatus, light output characteristics of the respective shutter portions of the exposing head change with time. This results from, for example, deterioration of the light source, partial variations in the transmittance of light through the optical fiber bundle, and a reduction in the function of the exposing head. With such changes in the light output characteristic over time, variations in exposure light amounts among the respective shutter portions become larger. As a result, exposure quality is reduced over time, and accurate images cannot be reproduced.

Accordingly, in known image recording apparatuses, a sensor for measuring the exposure light amounts of the respective shutter portions is provided in a position facing the exposing head so as to enable scanning along the direction in which the respective shutter portions are aligned. Based on the measured light value of the sensor, shutter opening times can be adjusted for each shutter portion. In other words, with this construction, even if the light output characteristics of the exposing head change over time, a reduction in image quality can be avoided by correcting the exposure light amounts based on the measured results from the sensor.

Alternatively, there is a method according to which a high resolution scanner for the original image is provided instead of the above light sensor. After a solid image of a single color is recorded on the entire surface of the printing paper, the printing paper is scanned by the scanner, and the amount of exposure light is corrected in accordance with the scanned result of the original image. According to this method, a test chart in which the respective shutter portions and the pixel positions of the printing paper have a one-on-one correspondence may be recorded by exposure.

Generally, the depth of focus is small in a digital line exposure device. Thus, in order to maintain good exposure quality of the exposing head, displacement of the printing paper in the focusing direction (direction normal to an image recording surface of the printing paper) is permissible in a range of 0.05 mm. Accordingly, when a sensor is provided opposite to the exposing head, a low-precision sensor having a scanning displacement of e.g. 1.00 mm (0.50 mm: this means a displacement range of 1.00 mm displaced 0.50 mm from a proper scanning position) is insufficient. Therefore, a high precision sensor having a scanning displacement of 0.10 mm (0.05 mm) or smaller, preferably 0.04 mm (±0.02 mm) or smaller is required to achieve satisfactorily high precision. It is noted that scanning displacement is a type of index indicating the precision of the sensor and is actually an indication of the displacement of the sensor during scanning in the normal direction.

If the exposing head can handle printing paper having a width of up to 305 mm, which is becoming mainstream, the scanning distance of the sensor needs to be 305 mm or longer. However, the longer the scanning distance, the more difficult it generally becomes to maintain a scanning displacement of 0.1 mm (±0.05 mm). Even if such a scanning displacement can be achieved, the production of the apparatus becomes more complicated, which increases the price of the apparatus. Thus, in order to achieve cost effective scanning, it is reasonable to use a sensor having a scanning displacement of 1.00 mm (±0.50 mm).

Figure 3A:
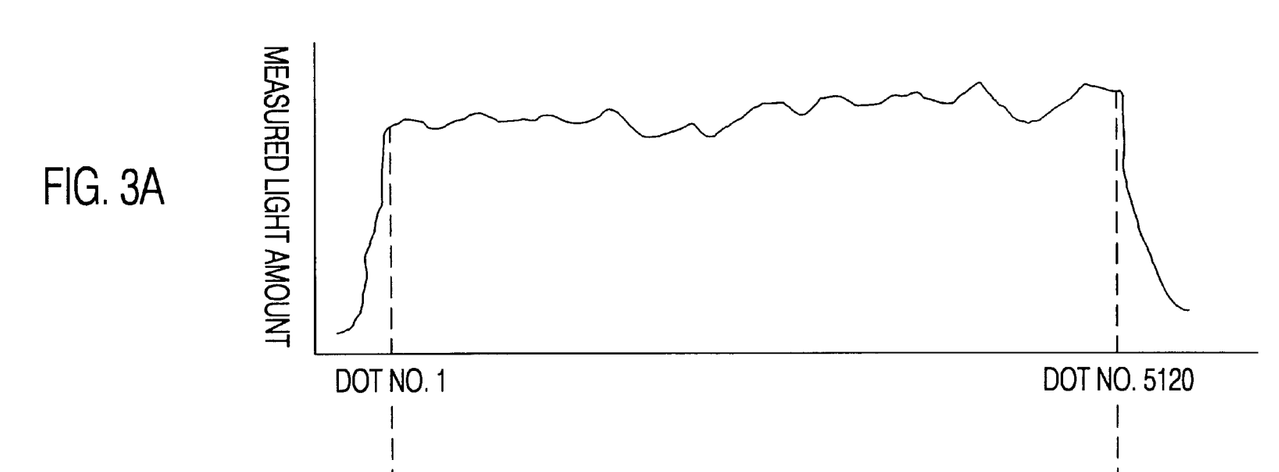
FIGS. 3A and 3B are graphs showing distribution of exposure light amounts of the respective shutter portions measured by a sensor having a scanning displacement of 0.04 mm (±0.02 mm), and by a sensor having a scanning displacement of 1.00 mm (±0.50 mm), respectively.
Figure 3B:
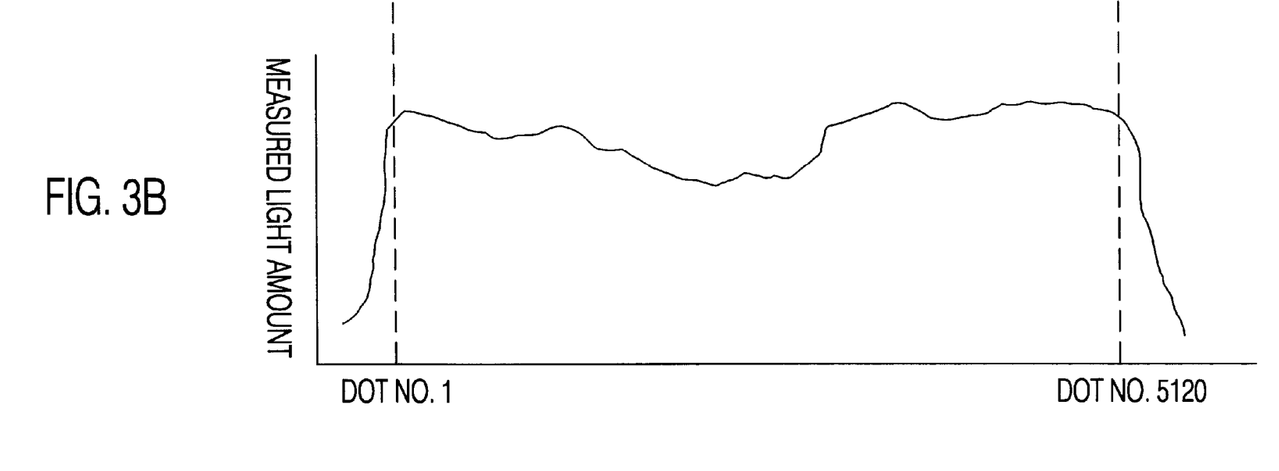

However, an apparatus using a sensor having a scanning displacement of 1.00 mm (±0.50 mm) has the following problem. FIG. 3A shows a measurement curve when the exposure light amounts of the respective shutter portions were measured by a sensor having a scanning displacement of 0.04 mm (±0.02 mm). FIG. 3B shows a measurement curve when light amounts were measured by a sensor having a scanning displacement of 1.00 mm (±0.50 mm). In this example, the exposing head had an exposure resolution of 400 DPI (dots per inch). The exposing head includes, for example, 5120 light output portions in order to handle printing paper having a width of 305 mm, accounting for errors in the width of the printing paper. It should be noted that Dot No. 1 and Dot No. 5120 correspond to the shutter portions located at the opposite ends of the linearly arranged shutter portions of the exposing head.

As can be seen from FIGS. 3A and 3B, a portion judged as having substantially proper amounts of exposure light by a sensor having a scanning displacement of 0.04 mm (±0.02 mm) may be judged to be insufficient using a sensor having a scanning displacement of 1.00 mm (±0.50 mm) due to the displacement of the sensor. In such a case, a controller generates a correction value to increase the exposure light amount, i.e. a correction value different from the correction value actually needed. Accordingly, the exposure correction cannot be accurately performed when using a sensor having a scanning displacement of 1.00 mm (±0.50 mm). As a result, prints of high quality cannot be obtained.

On the other hand, when the exposure correction is performed using a high-resolution scanner, it is necessary to use a scanner having a resolution at least higher than the exposure resolution of the exposing head. It is known that a scanner having a resolution five times that of the exposure resolution must be used in order to obtain a satisfactory correction value. In other words, an original scanner having a resolution of 2000 DPI or higher is needed to achieve an exposure resolution for the exposing head of 400 DPI. However, since such a high-resolution original scanner is expensive, the price of the image recording apparatus becomes too expensive if the exposure correction is performed using this method.

SUMMARY OF THE INVENTION

In order to overcome the above problems, an object of the present invention is to provide an image recording apparatus which can accurately correct exposure light amounts even when using a sensor of relatively low precision having a relatively long scanning displacement so that the apparatus can be manufactured at a reduced price. It is also an object of the present invention to provide a method for recording images.

According to the invention, there is provided an image recording apparatus for recording an image on a photosensitive material, which is not in contact with an exposing head, by driving light output portions of the exposing head in accordance with an image signal to control the transmission of light. The image recording apparatus comprises an exposure measuring means for measuring exposure light amounts of the respective light output portions, an exposure correcting means for correcting the exposure light amounts of the respective light output portions, and a storage means for storing correction reference exposure light amounts, wherein the exposure correcting means corrects the exposure light amounts of the respective light output portions based on a comparison of the exposure light amounts measured by the exposure measuring means with the correction reference exposure light amounts stored in the storage means.

Using this invention, the respective light output portions of the exposing head are controlled in accordance with the image signal. Rays of light transmitted through the light output portions reach the photosensitive material, thereby recording an image on the photosensitive material.

The light output characteristics of the light output portions change with time due to, for example, the deterioration of a light source. However, the exposure correcting means corrects the exposure light amounts of the light output portions to reduce or eliminate nonuniformities and variations in the exposure light amounts, which result from changes in the light output characteristics over time. As a result, a precise image can be recorded on the photosensitive material even after extended use.

Generally, when the result of the exposure measuring means for a specific light output portion indicates a shortage of the exposure light amount, this measurement can be relied on if the exposure measuring means is of high precision. However, if the exposure measuring means is of low precision, it cannot distinguish whether the measurement result really indicates a shortage of light or, despite a proper exposure, the exposure light amount was not accurately measured due to the low precision of the exposure measuring means.

However, in the present invention, the exposure correcting means corrects the exposure light amounts based on a comparison of the exposure light amounts measured by the exposure measuring means (basic exposure light amounts) with the reference light amounts stored in the storage means. Accordingly, even if the exposure measuring means cannot accurately measure the exposure light amounts due to, e.g. insufficient precision, whether or not the exposure light amounts are insufficient in the specific light output portions can be accurately and easily judged by comparing the measurement result with the correction reference exposure light amount. Further, since the exposure correction is performed based on the reference exposure light amounts, it can be more accurately performed compared to the case where it is performed based on a result that is measured for each case.

Accordingly, in the present invention, the exposure light amounts can be accurately corrected even if the exposure measuring means is constructed using a relatively inexpensive device having a relatively low precision. As a result, the price of the apparatus can be reduced by using, for example, an inexpensive sensor.

Further, since the correction reference exposure light amounts are constantly stored in the storage means, it is not necessary to obtain them using a high-resolution original scanner every time the correction is performed. This obviates the need for continually providing an expensive original scanner in the apparatus. For this reason as well, the price of the apparatus can be reduced.

Preferably, the correction reference exposure light amounts are set according to the precision of the exposure measuring means. With this construction, the exposure correction can be reliably performed regardless of the precision of the exposure measuring means used since the correction reference light exposure amounts are set according to the precision of the exposure measuring means. Thus, the exposure measuring means can have various levels of precision. This results in a larger variation of settings for the apparatus. This enables a user to select from a wider range of options.

Preferably, the correction reference exposure light amounts are measured by the exposure measuring means immediately after the exposing head performs an exposure. Thus, the exposure light amounts are corrected in advance by the exposure correcting means based on the image density of the photosensitive material. With this construction, there is hardly any change in light output characteristics of the light output portions within the short period of time between the exposure measuring means measuring the exposure light amounts and the exposing head performing an exposure with the corrected exposure light amounts. Accordingly, reliable correction reference exposure light amounts can be obtained regardless of the precision of the exposure measuring means. As a result, the exposure light amounts can be more accurately corrected.

Preferably, the exposure correcting means corrects the exposure light amounts of the respective light output portions such that the exposure light amounts measured by the exposure measuring means agree with the correction reference exposure light amounts stored in the storage means. Since the exposure light amounts are corrected such that those measured by the exposure measuring means agree with the correction reference exposure light amounts, nonuniformity and variation in the exposure light amount among the light output portions can be greatly reduced or completely eliminated even if the light output characteristics change over time. As a result, the photosensitive material can be more uniformly exposed to achieve a higher quality image.

Preferably, a main portion of the exposing head is a PLZT (lead lanthanum zirconate titanate) device. PLZT devices have both a high light transmitting property/high light transmission ratio and an electrooptic effect of changing its index of birefringence upon application of a voltage. Further, PLZT devices have a higher exposing ability than, for example, a light-emitting diode, liquid crystal, or a fluorescent display tube. Therefore, highly minute dots can be formed by utilizing a PLZT device for the exposing head.

According to the invention, there is provided a method for recording an image on photosensitive material using an image recording apparatus comprising: providing an exposure correcting means for correcting exposure light amounts of respective light output portions of an exposing head, acquiring correction value data for correcting exposure light amounts of the respective light output portions to correspond to predetermined optimum exposure light amounts;

adjusting said exposure correcting means in accordance with the correction value data;

acquiring and storing correction reference exposure light amounts for the respective light output portions;

measuring basic exposure light amounts of the respective light output portions using an exposure measuring means incorporated into the image recording apparatus; and recording one or more images on the photosensitive material, wherein the exposure light amounts are corrected in accordance with a comparison of the previously measured basic exposure light amounts with the correction reference exposure light amounts.

Preferably, the image recording apparatus used for this method is the image recording apparatus as described above.

According to a preferred embodiment, the correction value data are determined in accordance with a measured image density of the image recorded on the photosensitive material.

The image density is preferably measured using a high-precision original scanner installed outside the image recording apparatus, e.g. at a manufacturer.

Preferably, the correction reference exposure light amounts are basic exposure light amounts measured by the exposure measuring means.

It is preferred that only the recording step is repeated for recording further images on the photosensitive material. The measuring step is repeated as required from time to time for newly measuring basic exposure light amounts.

Thus, during normal operation of the image recording apparatus, only the recording step will be repeatedly performed. However, it might be necessary to re-measure from time to time the basic exposure light amounts in order to take into account, e.g., changes in the light output characteristics of the light output portions.

BRIEF DESCRIPTION OF THE DRAWINGS

These and other objects, features and advantages of the present invention will become more apparent upon a reading of the following detailed description and accompanying drawings in which.

DETAILED DESCRIPTION OF THE PREFERRED EMBODIMENTS

Figure 1:
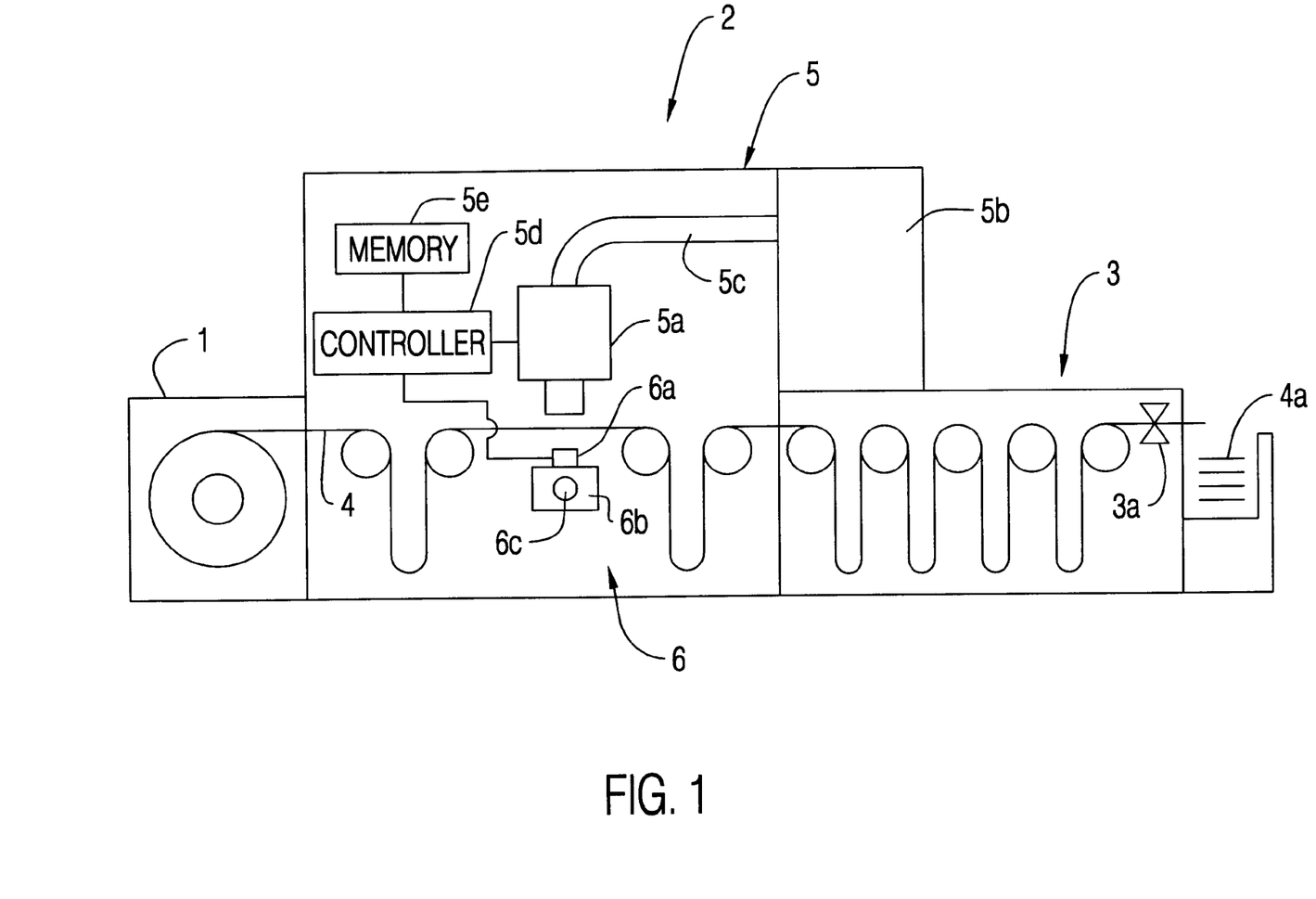
FIG. 1 is a schematic view of an image recording apparatus according to one embodiment of the invention.

An image recording apparatus according to the invention is provided with a magazine 1, an image recording unit 2 and a processing unit 3 as shown in FIG. 1. The magazine 1 is a printing paper container for holding a roll of unexposed and undeveloped printing paper 4 (photosensitive material). The printing paper 4 is fed to the exposure position inside the image recording unit 2.

The image recording unit 2 is comprised of an exposure device 5 for exposing the printing paper 4 fed to the exposure position to form an image thereon and a measuring device 6 for measuring exposure light amounts of light output portions of a PLZT (lead lanthanum zirconate titanate) head 5a of the exposure device 5 to be described later. A more detailed description of the image recording unit 2 is also described later.

The processing unit 3 is provided with a developing assembly and a drying assembly. The developing assembly includes several treatment liquid tanks each containing a color developer, a bleaching liquid, a fixer and a stabilizer. The printing paper 4 having images formed thereon in the exposure device 5 is developed by being successively immersed in the respective treatment liquids. The drying assembly dries the printing paper 4 processed by the developing assembly.

The processing unit 3 includes a cutter 3a for cutting the printing paper 4 dried by the drying assembly frame by frame, and the cut pieces of printing paper 4 are discharged from the apparatus as finished prints 4a.

Next, the image recording unit 2 is described in detail. As shown in FIG. 1, the exposure device 5 of the image recording unit 2 is comprised of the PLZT head 5a (exposing head), a light source 5b, an optical fiber bundle 5c for introducing light from the light source 5b to the PLZT head 5a, a controller 5d (exposure correcting means) and a memory 5e (storage means).

The PLZT head 5a is constructed such that a PLZT device made from a transparent ceramic material having a strong dielectric property is arranged between a pair of polarizing plates each having a polarizer and an analyzer. The PLZT device is a solid solution containing $(Pb_{1-x}La_x)(Zr_yTi_{1-y})_{1-x/4}O_3$ obtained by adding lanthanum to a solid solution (PZT) of lead zirconate ($PbZrO_3$) and lead titanate ($PbTiO_3$) at a suitable ratio and hot-pressing.

This PLZT head 5a is provided with shutter portions for controllably transmitting and blocking light from the light source 5b. The respective shutter portions are linearly arranged in a direction (widthwise direction of the printing paper 4) normal to the transport direction of the printing paper 4. In this embodiment, the exposure resolution of the PLZT head 5a is 400 DPI. For example, 5120 shutter portions are provided so that the printing paper 4 having a width of 305 mm (approx. 12 inches) can be easily handled. In view of the possibility of errors in the width of the printing paper 4, the number of shutter potions should at least be more than 4800 which is simply calculated by multiply the 400 DPI by 12 inches. In this case the PLZT head 5a is sent an image data of 5120 dots.

Such a PLZT head 5a has both a high light transmitting property and an electrooptic effect. Accordingly, if the drive voltage corresponding to the image data is applied to the shutter portion in a position corresponding to a desired pixel, a polarized state of the light ray, linearly polarized by the polarizer, undergoes a change when passing through the PLZT device. Therefore light components coinciding with the polarizing plane of the analyzer emerge from the analyzer to expose the printing paper 4.

Although the exposing head is comprised of the PLZT device in this embodiment, it may, of course, be comprised of an LED (light-emitting diode) array, liquid crystal, a fluorescent display tube, or the like. However, since the PLZT device has a better exposing ability than the other devices, highly minute dots can be formed. Additional advantages of the PLZT device include a very high response speed, a broad range for the ratio of the light transmission that ranges from high to as low as 2000:1. In addition, the PLZT head can be used in a wide temperature range, and it has a long lifetime.

Since the LED array is itself a light emitting element, it is not necessary to provide a separate light source if the emitting light is applied to the exposing head. As a result, the construction of the apparatus can be simplified. However, since there is variation in light intensity among the respective colors of R, G, B (red, green, blue), exposure control must take these variations into account in order to obtain a high quality print. Although liquid crystals are not particularly suitable for a line exposure device since they have a slow response speed, it is possible to employ them in the exposing head.

The light source 5b is, for example, a white light source. A disk-shaped color filter (not shown) having three color areas of R, G, B is provided at the side of the light source 5b toward the optical fiber bundle 5c. Accordingly, chromatic color light rays of R, G, B are successively projected onto one pixel line of the printing paper 4 by the light from the light source 5b transmitting through the disk-shaped filter. Thereafter, exposure for three colors is performed line by line.

The controller 5d drives the respective shutter portions of the PLZT head 5a in accordance with the image data transmitted from an original scanner or computer located outside the apparatus. In addition, the controller 5d controls the opening times of the respective shutter portions of the PLZT head 5a in order to adjust the amount of exposure light from the PLZT head 5a. In this way the distribution of exposure light measured by a sensor 6a (to be described later) agrees with the distribution of the correction reference exposure light amounts stored in the memory 5e.

The memory 5e is able to store, for example, exposure light amounts measured by the sensor 6a immediately after the first exposure correction, for example, after the shipment of the apparatus. Thus, the correction reference exposure light amounts are set in accordance with the scanning displacement of the sensor 6a and changes depending on the precision of the sensor used.

In particular, in one embodiment of the present invention, a sensor having a scanning displacement of 1.00 mm (±0.5 mm) is used as the sensor 6a. Even when a sensor having a larger scanning displacement is used, correction reference exposure light amounts corresponding to this scanning displacement are set and stored in the memory 5e. Thus, it is possible to use a sensor 6a whose scanning displacement is other than 1.00 mm (±0.50 mm). This allows for an increased variation in the apparatus and enables a user to select the apparatus from a wider range of characteristics.

Here, the first exposure correction after the shipment of the apparatus is performed by scanning a finished print with a high-precision original scanner installed, for example at the manufacturer and feeding the measurement to the controller 5d. Therefore, in the present invention, it is not necessary to provide an expensive high-precision original scanner in the apparatus.

A condenser lens, not shown, for focusing light transmitted through the PLZT head 5a on the printing paper 4 is provided on the side of the PLZT head 5a toward the printing paper 4. This condenser lens is such that a plurality of small lenses corresponding to a plurality of shutter portions (not in one-on-one correspondence with the shutter portions) are linearly aligned along the widthwise direction of the printing paper 4. The use of such a condenser lens enables a non-contact arrangement of the PLZT head 5a and the printing paper 4.

For example, in a contact type arrangement in which an exposing head and a photosensitive material are held in contact as in a flat CRT (cathode-ray tube), light rays emerging from the exposing head cannot be directly scanned by a sensor provided opposite to the exposing head for the following reason. Specifically, in the contact type arrangement, exposure light can be focused only when the exposing head and the photosensitive material are in contact with each other. Thus, in order for the sensor to scan the output light of the exposing head with the exposure light being focused, the sensor needs to be brought into direct contact with the exposing head. However, in such a case, both the exposing head and the sensor may end up being damaged. As a result, the output light cannot be directly scanned in the contact type arrangement. In the non-contact type arrangement as in the present invention, the sensor can securely measure the output light without damaging the exposing head and the sensor.

Next, the construction of the measuring device 6 is described. The measuring device 6 is provided in a position opposite to the exposing device 5 while holding the printing paper 4 therebetween. The measuring device 6 comprises the sensor 6a (exposure measuring means), a sensor mount 6b and a ball screw 6c.

The sensor 6a measures the amount of light transmitted through the PLZT head 5a and rests on the sensor mount 6b. The sensor 6a according to this embodiment is a sensor having a scanning displacement of 1.00 (±0.50 mm) and is less expensive than those having scanning displacements of 0.04 (±0.02 mm) and 0.10 (±0.05 mm). The result of the sensor measurement 6a is fed to the controller 5d. It should be noted that the scanning displacement of the sensor 6a does not change with time unlike the light output characteristic of the PLZT head 5a.

The sensor mount 6b is movable along the widthwise direction of the printing paper 4 as the ball screw 6c provided along this widthwise direction is rotated. Accordingly, the sensor 6a can scan the respective shutter portions of the PLZT head 5a along the widthwise direction by the rotation of the ball screw 6c.

Next, the operation of the image recording apparatus according to the invention is described. This operation is roughly divided into 1) obtaining correction reference exposure light amounts and 2) correcting the exposure light amounts based on the obtained correction reference exposure light amounts.

First, the operation of obtaining the correction reference exposure light amounts is described. The printing paper 4 is fed to the exposure position. The controller 5d drives the respective shutter portions of the PLZT head 5a in accordance with the image data, and the printing paper is exposed to light from the light source 5b introduced via the optical fiber bundle 5c. In this way a solid single color image is formed on the entire surface of the printing paper 4. It is desirable to provide this single color solid image with markings every, e.g. 100 dots in order to enable the recognition of the respective shutter positions (dot positions).

Subsequently, the printing paper 4 bearing the solid image is conveyed to the processing unit 3, in which development, drying and other necessary processing are applied. Then, one frame of the solid image is cut off by the cutter 3a.

Thereafter, the image density of one frame of the solid image is scanned by a high-precision original scanner which is installed outside the apparatus, for example, at a manufacturer. If the original scanner recognizes a pixel having an insufficient exposure light amount, data such as the position of this pixel and a shortage of the exposure light amount are transmitted to the controller 5d. Upon receipt of the data (correction value data), the controller 5d performs, in subsequent printing operations, such a control as to, for example, extend the opening time of the shutter portion corresponding to the pixel position of the PLZT head 5a by the amount of time necessary to avoid a shortage of the exposure light amount. In this way, nonuniformity and variations in the exposure light amount among the respective shutter portions are first corrected.

The aforementioned exposure light amount correction may be performed at the manufacturer just before the apparatus is shipped. If this correction is not made before shipment, a user may bring the apparatus to the manufacturer for correction or the user may do so themselves by connecting a scanner to the apparatus. A most efficient way would be for the user to send a solid image printed by him to the manufacturer, who then makes a correction (calculate a correction value) based on the received image.

Subsequently, the controller 5d drives the respective shutter portions of the PLZT head 5a using the above correction value and causes the ball screw 6c to rotate. This causes the sensor 6a to scan in the direction in which the shutter portions are aligned. As a result, the sensor 6a measures the amount of exposure light from the shutter portions.

Figure 2A:
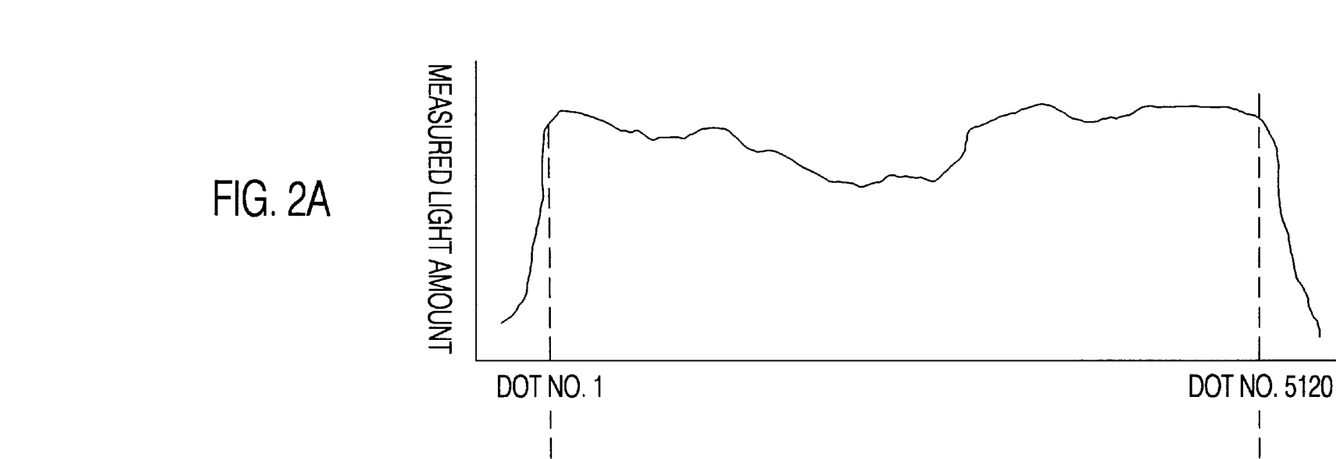
FIG. 2A is a graph showing the distribution of correction reference exposure light amounts of shutter portions stored in the memory of the image recording apparatus.

A distribution of the exposure light amounts of the respective shutter portions obtained by the sensor 6a is shown in FIG. 2A. It should be noted that Dot No. 1 and Dot No. 5120 correspond to the shutter portions located at the opposite ends of the linearly aligned shutter portions of the PLZT head 5a.

Based on FIG. 2A, there would appear to be variation in the amount of exposure light of the respective shutter portions. However, in fact, there is hardly any variation in the exposure light amounts. This is because a measurement curve shown in FIG. 2A is obtained immediately after the exposure light amounts are corrected based on the measurement result of the original scanner. A change in the light output characteristics with time will not occur within the short period which elapses until the sensor 6a first measures the exposure light amounts after the above correction is performed. Further, with a sensor 6a having a longer scanning displacement, variations in the exposure light amounts like those shown in FIG. 2A are seen, even though the exposure light amounts hardly vary.

Accordingly, in this embodiment, the measurement curve of FIG. 2A obtained by the sensor 6a is stored in the memory 5e as a distribution of correction reference exposure light amounts. At this time, the correction reference exposure light amounts are set according to the precision of the sensor 6a. Thereafter, the user corrects the exposure light amounts based on the distribution of correction reference exposure light amounts, for example, every time the apparatus is started. Next, the operation of correcting the exposure light amounts based on the obtained correction reference exposure light amounts is described below. Here, it is assumed that a long enough time has elapsed for the light output characteristics of the shutter portions of the PLZT head 5a to change with time after the correction reference exposure light amounts were obtained due to the deterioration of the light source 5b and/or other causes.

Figure 2B:
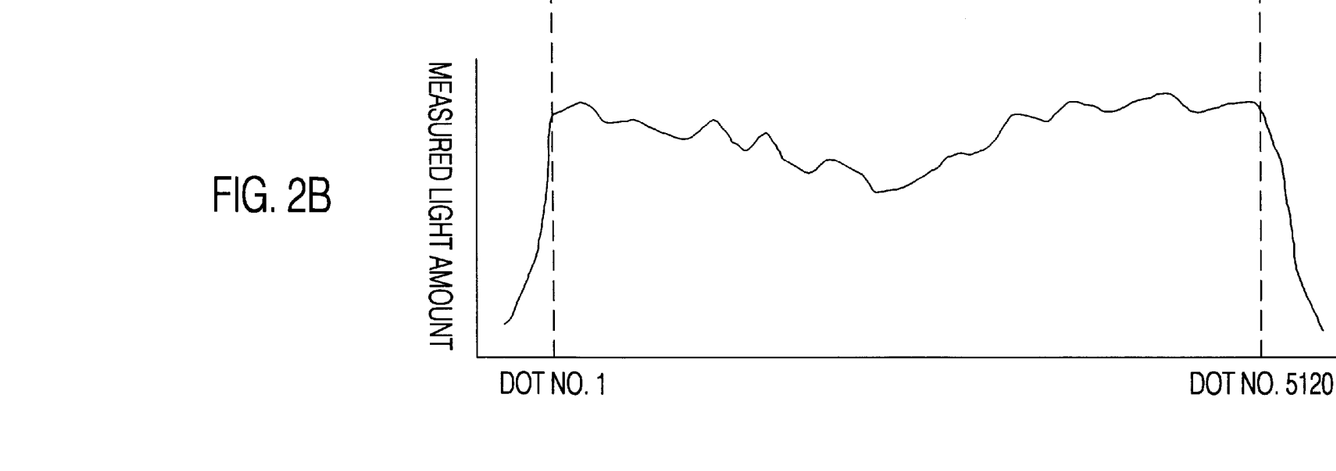
FIG. 2B is a graph showing the distribution of exposure light amounts of the respective shutter portions measured by a sensor after light output characteristics of the respective shutter portions have changed with time.

First, before recording an image by exposing printing paper 4 to light, the controller 5d drives the respective shutter portions of the PLZT head 5a using the correction amounts, with which the exposure light amounts were corrected for the first time using a scanner. The sensor 6a scans the shutter portions in the direction of their alignment, thereby measuring the exposure light amounts of the shutter portions. The distribution of the exposure light amounts of the respective shutter portions obtained by the sensor 6a is shown in FIG. 2B. Such a measurement curve is transmitted to the controller 5a as data.

Subsequently, the controller 5d drives the shutter portions such that the measurement curve shown in FIG. 2B agrees with the one shown in FIG. 2A stored in the memory 5e. Specifically, on the basis of the measurement curve of FIG. 2A, the controller 5d adjusts the opening time of each shutter portion whose measured exposure light amount in FIG. 2B differs from that in FIG. 2A. This causes the amount of measured light of this shutter portion to agree with the correction reference exposure light amount of FIG. 2A. Upon completion of the correction of the exposure light amounts based on the correction reference exposure light amounts, a normal printing operation is performed with the exposure light amounts thus corrected from that time on.

Specifically, normal printing paper 4 is set in the magazine 1 and fed to the exposure position. Then, the controller 5d drives the shutter portions of the PLZT head 5a based on image data transmitted from a personal computer (not shown) or the like in such a manner that the resulting exposure light amounts agree with the correction reference exposure light amounts. As a result, the printing paper 4 is exposed to light.

Accordingly, in this case, highly minute dots are formed on the printing paper 4 by setting the proper exposure light amounts, despite the fact that the output light characteristics of the shutter portions of the PLZT head 5a have changed with time. The printing paper 4 having the image formed thereon by this exposure is then conveyed to the processing unit 3 to be developed and dried. Thereafter, the processed printing paper is finished into prints 4a after being cut frame by frame by the cutter 3a.

As described above, when using a sensor 6a having a larger scanning displacement, a shortage in the exposure light amount in the specific shutter portion can be properly recognized by a comparison of the measured result of the sensor 6a with the correction reference exposure light amounts. In contrast, errors in exposure light cannot be accurately measured if there is insufficient precision in the sensor 6a. Thus, the exposure light amounts can be reliably corrected based on this recognition. Further, since the correction is made based on the correction reference exposure light amounts, the exposure light amounts can be more accurately corrected as compared to the case where the exposure light amounts are corrected only based on the measured results.

Therefore, according to this embodiment of the present invention, the exposure light amounts can be accurately corrected even if the sensor 6a is a relatively inexpensive sensor of relatively low precision. As a result, the cost of the apparatus can be reduced.

Further, since the obtained correction reference exposure light amounts can be stored in the memory 5e, it is not necessary to obtain them using a scanner every time the correction is performed. Since a scanner is therefore not required in the apparatus, the price of the apparatus can be further reduced.

The correction reference exposure light amounts are obtained by the sensor 6a immediately after the exposure light amounts are accurately corrected using a high-precision scanner. Therefore, they are highly reliable as a correction reference regardless of whether the scanning displacement of the sensor 6a is large or small. Thus, the exposure light amounts can be more accurately corrected by performing the correction based on the highly reliable correction reference exposure light amounts.

Further, since the controller 5a corrects the exposure light amounts such that the exposure light amounts measured by the sensor 6a agree with the correction reference exposure light amounts, nonuniformity and variation of the exposure light amounts among the shutter portions can be almost eliminated even if the light output characteristics change with time. As a result, the printing paper 4 is even more uniformly exposed to light, ensuring an image of higher quality. The above effect can be sufficiently obtained even if the above correction is performed such that the exposure light amounts measured by the sensor 6a are not perfect, but substantially agree with the correction reference exposure light amounts.

Although the exposure light amounts are corrected by adjusting the opening times of the respective shutter portions in the foregoing embodiment, it can also be carried out by adjusting the intensity of the light source 5b. The substantially same effects as the foregoing embodiment can be obtained using this method. However, the method for adjusting the intensity of the light source 5b enables an adjustment of the exposure light amount of the entire head, but not an adjustment of the exposure light amount per dot.

The correction reference exposure light amounts used are the exposure light amounts measured by the sensor 6a immediately after the PLZT head 5a performed an exposure with the exposure light amounts corrected by the controller 5d based on the measured results of the original scanner in the foregoing embodiment. However, the time at which the correction reference exposure light amounts are set is not limited to the above. In other words, the correction reference exposure light amounts may be set based on the time required for the light output characteristic of the PLZT head 5a to change. For example, if the light output characteristic would not change even after one hour after the apparatus was started, the exposure light amounts measured upon the elapse of one hour after the correction using the original scanner might be used as correction reference exposure light amounts.

According to the foregoing embodiment, a color image corresponding to the image data is recorded on the printing paper 4 by arranging a disk-shaped color filter between the light source 5b and the PLZT head 5a and adjusting the color of the light to be incident on the PLZT head 5a. However, the present invention can also be applied to a construction in which the PLZT head 5a also functions as a color filter for substantially transmitting only light components having specific wavelengths by applying drive voltages corresponding to the respective colors to the respective shutter portions of the PLZT head 5a.

As described above, the inventive image recording apparatus comprises a storage means for storing the correction reference exposure light amounts, and the exposure correcting means thereof corrects the exposure light amounts of the light output portions based on the comparison of the exposure light amounts measured by the exposure measuring means with the correction reference exposure light amounts stored in the storage means.

Accordingly, even if the exposure measuring means cannot accurately measure the exposure light amounts due to, e.g. its low precision, whether or not the exposure light amount is insufficient in the specific light output portion can be accurately and easily judged by comparing the measurement result with the correction reference exposure light amount. Further, since the exposure light amounts are corrected based on the correction reference exposure light amounts, the correction can be more accurately performed as compared to the case where it is performed only based on a measured result.

What is claimed is:

1. An image recording apparatus for recording an image on a photosensitive material, comprising:

an exposing head disposed out of contact with the photosensitive material, the exposing head having light output portions that are controlled in accordance with an image signal to control transmission of light, an exposure measuring means for initially measuring exposure light amounts for one image, a storage means for storing the exposure light amounts as correction reference exposure light amounts, wherein said exposure measuring means subsequently measures further exposure light amounts for the one image, said exposure measuring means having a relatively low precision, comparing means for comparing the further exposure light amounts with the correction reference exposure light amounts, and an exposure correcting means for correcting the exposure light amounts of the light output portions based on the comparison of said comparing means.

2. An image recording apparatus as defined in claim 1, wherein the exposing head performs an exposure with the exposure light amounts corrected by the exposure correcting means based on an image density of the photosensitive material.

3. An image recording apparatus as defined in claim 1, wherein the exposure correcting means corrects the exposure light amounts of the respective light output portions such that the exposure light amounts measured by the exposure measuring means agree with the correction reference exposure light amounts stored in the storage means.

4. An image recording apparatus as defined in claim 1, wherein a main portion of the exposing head is a PLZT device.

5. A method for recording an image on a photosensitive material using an image recording apparatus comprising:

providing an exposing head disposed out of contact with the photosensitive material, initially measuring exposure light amounts of light output portions for one image by an exposure measuring means, the exposure measuring means having a relatively low precision, storing the exposure light amounts as the correction reference exposure light amounts in a storage means, subsequently measuring further exposure light amounts for the one image with the exposure measuring means, comparing the further exposure light amounts with the correction reference exposure light amounts by a comparing means, and correcting the exposure light amounts of the light output portions by an exposure correcting means based on the comparison of said comparing means.

6. A method as defined in claim 5, wherein at least one of said step of initially measuring and said step of subsequently measuring includes measuring an image density of the one image recorded on the photosensitive material.

7. A method as defined in claim 6, wherein the image density is measured using a high-precision original scanner installed outside the image recording apparatus.

8. A method as defined in claim 5, wherein the correction reference exposure light amounts are basic exposure light amounts measured by the exposure measuring means.

9. A method as defined in claim 5, wherein only the recording step is repeated for recording further images on the photosensitive material, and step of subsequently measuring is repeated as required from time to time for measuring basic exposure light amounts.

* * * * *